Figure 3:
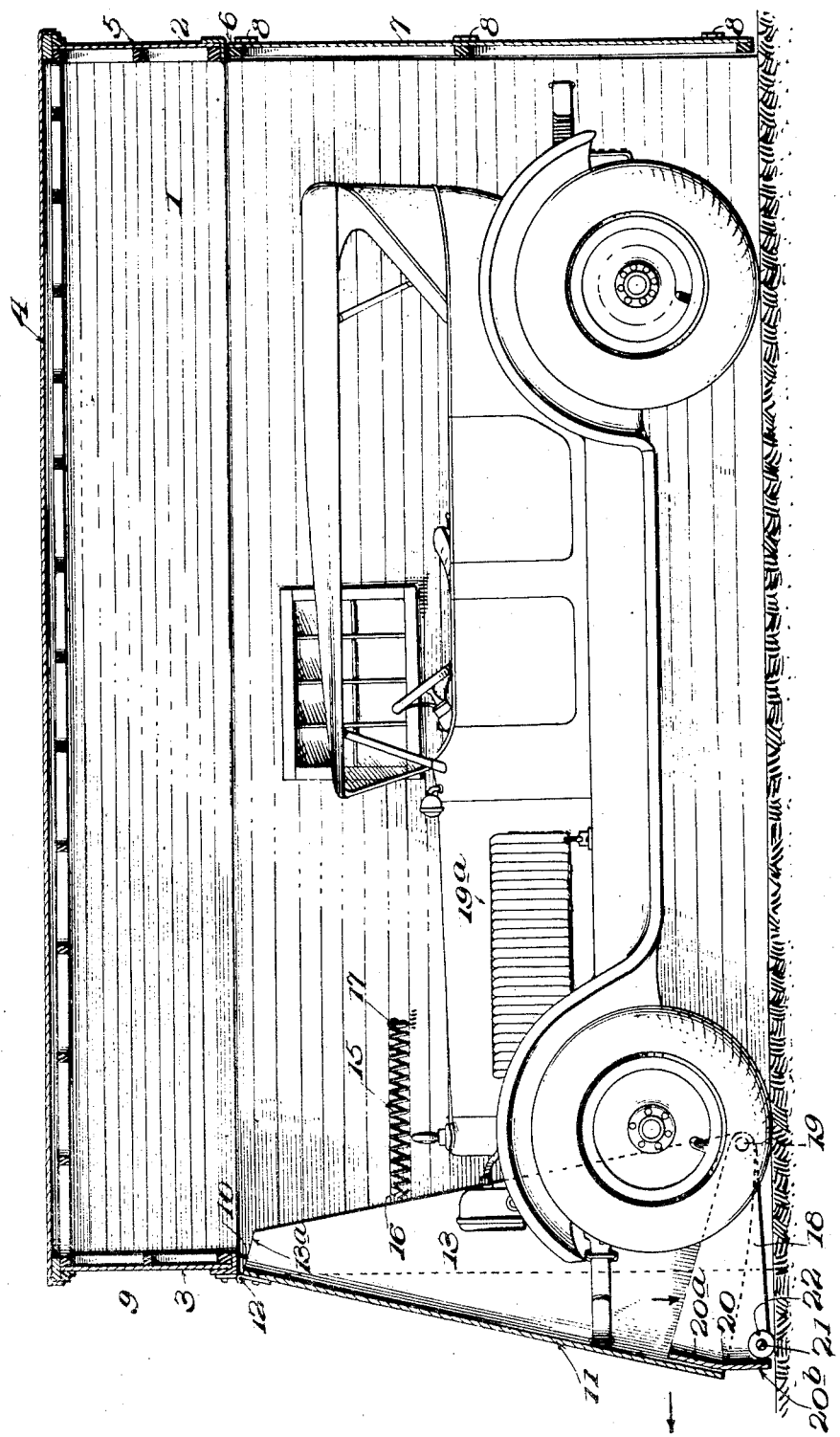

May 31, 1927.
W. F. WATSON
GARAGE
Filed July 19, 1926
1,630,553
2 Sheets-Sheet 1
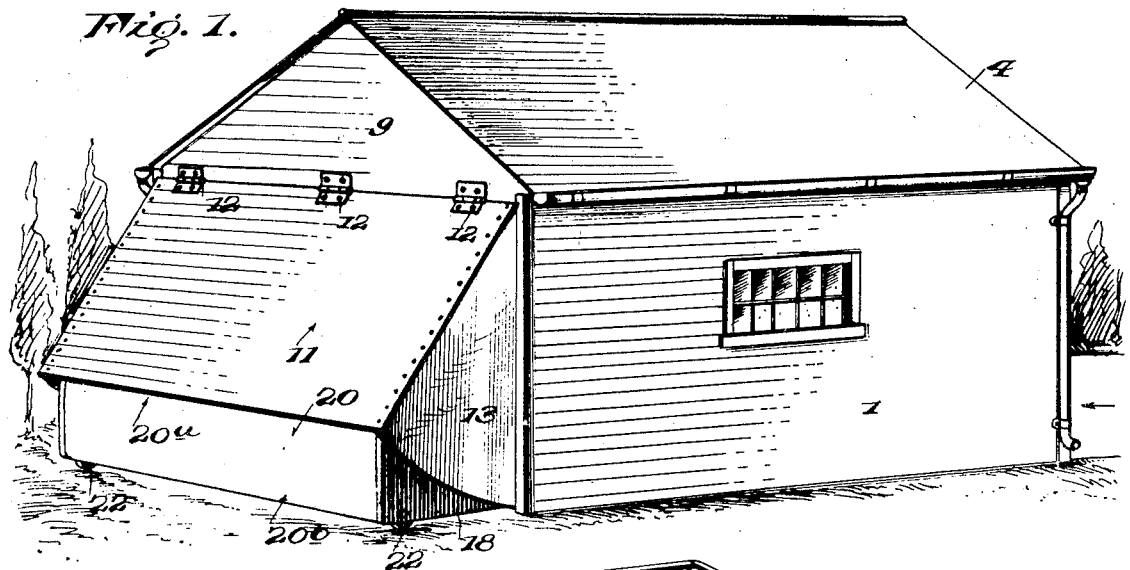
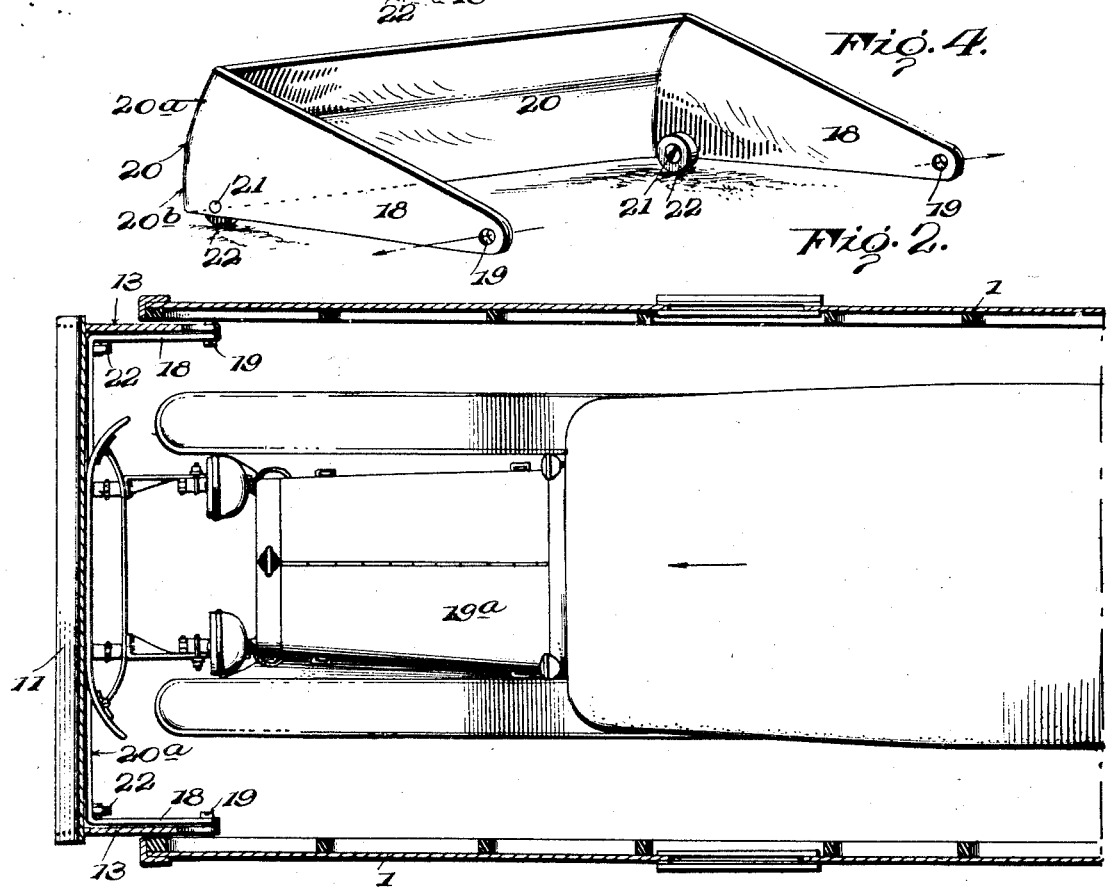
WITNESSES
INVENTOR
W. F. Watson.
BY
ATTORNEYS May 31, 1927. W. F. WATSON 1,630,553
GARAGE
Filed July 19, 1926 2 Sheets-Sheet 2

WITNESSES
INVENTOR
W. F. Watson.
BY
ATTORNEYS

Patented May 31, 1927.

1,630,553

UNITED STATES PATENT OFFICE.

WILLIAM F. WATSON, OF ATHENS, GEORGIA.

GARAGE.

Application filed July 19, 1926. Serial No. 123,459.

My invention relates to improvements in garages, and it consists in the combinations, constructions and arrangements herein described and claimed.

A garage of a constant length may be too short to accommodate an automobile that is longer than the automobile for which the garage was provided originally. It then has been necessary prior to the present invention to built an addition to the old garage or to provide an entirely new garage. In either event, a considerable expense was involved.

Also, it frequently happens that drivers of automobiles are unable to stop the automobiles on entering garages of a constant length before the automobiles bump into the rear walls of such garages, with consequent damage to an automobile that has forcibly struck the rear wall of a garage.

An object of the present invention is to obviate the above mentioned objectionable features of a garage of constant length by providing a garage which is adapted to have the effective length thereof extended to house an automobile of a greater length than the body of the garage and which is adapted to be extended in length as the result of pressure or impact of an automobile that has entered in the garage against a swingable section of the rear wall of the garage so that injury to an automobile and the garage will be prevented should such automobile be driven into the garage and accidentally against the swingable section of the rear wall of the garage.

A further object of the invention is the provision in a garage of the character described of a primary swingable closure unit for closing an opening in rear end wall of the garage and a self-adjusting secondary swingable closure unit for closing the space between the lower edge of the primary closure unit and an underlying surface when the primary closure unit is open and adapted to telescope into the primary closure unit when the latter is in fully closed position.

A further object of the invention is the provision of a garage of the character described which normally will have the appearance of a garage of ordinary construction.

Other objects and advantages of the invention will be apparent from the following description, considered in conjunction with the accompanying drawings, forming a part of this application, in which—

Figure 1 is a perspective view of a garage embodying the invention, showing a swingable section of the rear wall of the garage in outwardly swung position, Figure 2 is a fragmentary horizontal section through the rear end portion of the garage, Figure 3 is a longitudinal vertical section through the garage, showing in full lines the swingable section of the rear wall of the garage in outwardly swung position to accommodate an automobile of greater length than the body of the garage, and showing in dotted lines the swingable section of the rear wall of the garage in normal position.

Figure 4 is a detail perspective view of one of the members of the swingable section of the rear wall of the garage.

A garage embodying the invention may include a pair of vertical side walls, as at 1, a front end wall generally indicated at 2, a rear end wall generally indicated at 3, and a roof structure 4 which may be of any suitable known type of construction.

The front end wall 2 of the garage may include a vertically disposed fixed section 5 above an opening 6 that extends from the lower edge of the section 5 to the floor of the garage and has a height greater than that of any automobile that can be accommodated in the garage. The width of the opening 6 may be equal to that of the front end wall 2 of the garage and in any event the opening 6 has a width greater than that of any automobile for which the garage is intended. This opening 6 may be closed normally by a pair of horizontally swingable doors 7 which may be attached to adjacent fixed walls of the garage by hinges, such as indicated at 8 in Figure 3.

The rear end wall 3 of the garage also may include a fixed vertical section 9 above an opening 10 that extends from the lower edge of the fixed section 9 to the floor of the garage and preferably has a height greater than that of any automobile which may enter the garage. The opening 10 may extend for the full width of the garage.

The rear end wall of the garage also includes a vertically swingable lower section 11 which is attached at its upper end to the fixed section 9 of the rear end wall of the garage at the upper edge of the opening 10 by hinges, as at 12. The section 11 is adapted to close the opening 10 when the section 11 is disposed in the plane of the section 9 of the rear end wall of the garage. The section 11 is provided with a pair of parallel side guard members or wings 13 which are joined integrally or otherwise at their rear edges to the side edges of the section 11 and which are adapted to swing forwardly through the opening 10 close to the side walls of the opening 10 into the garage close to the side walls of the garage when the section 11 swings from outwardly swung position as shown in Figure 1 and by the full lines in Fig. 3 to vertical position in the plane of the fixed section 9 of the rear wall of the garage, as shown by the dotted lines in Figure 3. The side guard members 13 preferably are parallel with each other and are substantially triangular in configuration, decreasing in width from their lower ends toward their upper ends, and having short slightly inclined top edges 13ª which will abut the upper wall of the opening 10 when the swingable section 11 is disposed in the plane of the opening 10 as shown in dotted lines in Figure 3. The guard members 13 are of sufficient width at their lower ends to permit the section 11 to swing outwardly from the plane of the fixed section 9 of the rear end wall of the garage a relatively great distance before the members 13 are swung completely out of the garage through the opening 10. Also, the lower edges of the side guard members 13 may be convexly curved longitudinally thereof substantially along arcs of a circle struck by a radius having a length equal to that of the section 11 and moving about the axial line of the pintles of the hinges 12 as a center, whereby the lower edges of the side guard members 13 will swing close to the ground or floor 14 at the rear of the garage when the section 11 is swung outwardly from the plane of the fixed section 9 of the rear end wall of the garage.

The section 11 normally is retained in position to close the opening 10 by a pair of retractile springs 15 which may be of coil form and which may be connected at their rearward ends to the upper end portions of the guard members 13, as at 16, and at their forward ends to the side walls of the garage as at 17.

The invention also provides means which are self-adjusting to close the space between the lower edges of the swingable section 11 and the side guards 13 and the underlying surface as the section 11 swings outwardly and upwardly from the plane of the opening 10. Such self-adjusting closure means also serves to make more uniform the rate of swinging movement of the section 11. The self-adjusting closure means comprises a pair of substantially triangular secondary side guard members 18 which are disposed vertically edgewise close to the inner faces of the primary side guard members 13. The members 18 taper in height from their rearward ends to their front ends as clearly shown in Figure 3 and the secondary side guard members 18 are attached adjacent to the front ends to the inner lower corner portions of the primary side guard members 13 by alined transverse pivot elements 19. The secondary side guard members are connected at their rearward ends by a cross member 20 which is adapted to swing close to the inner face of the lower portion of the swingable rear end section 11 of the garage to and from position to depend below the lower edge of the swingable end section 11. The upper approximately half portion 20ª and the lower approximately half portion 20ᵇ of the cross member 20 join each other at an obtuse angle so that the entire cross member 20 can swing to position above the level of the lower edge of the section 11 and close to the inner face of the section 11 when the latter is in vertical position in the plane of the opening 10. When the section 11 has been swung outwardly from the plane of the opening 10 to the position shown by the full lines in Fig. 3, the upper edge of the member 20 will lie close to the inner face of the section 11 and the lower portion 20ᵇ of the member 20 will be substantially vertical. The member 20 thus may be termed a secondary swingable rear end section for the garage. The secondary guard members 18 carry short transversely alined stub axles which extend laterally inward from the members 18 adjacent to the lower edges of the rearward end portions of the members 18. The axles 21 carry wheels 22 which depend below the lower edges of the members 18 and are in rolling contact with the surface which underlies the garage. The section 11 and the primary side guard members 13 may be termed a primary closure unit into which the self adjusting secondary closure unit that consists of the members 20 and 18 will telescope when the section 11 of the primary closure unit is disposed in the plane of the remainder of the rear end wall of the garage.

From the foregoing description of the various parts of the device, the operation thereof may be readily understood. When the section 11 is disposed in position to close the opening 10 and in the plane of the fixed section 9 of the rear end wall of the garage, the garage will have the appearance of an ordinary garage of constant length. However, the improved garage is adapted to house an automobile, as at 19ª, which has a length greater than that of the body of the garage. Such automobile may be driven through the opening 6 in the front end wall of the garage rearwardly in the garage and when the front bumper strikes the swingable section 11, the latter will be swung outwardly and upwardly against the action of the springs 15 until the rear end portion of the automobile has passed completely through the opening 6 in the front end wall of the garage to position to permit closing of the front doors 7. The members 20 and 18 of the secondary closure unit will swing downwardly by gravity about the axial line of the pivot elements 19 as the section 11 swings rearwardly and upwardly so that the spaces between the lower edges of the members 11 and 13 and the surface that underlies the garage will be closed by portions of the members 20 and 18, respectively, whereby the portion of the automobile that protrudes from the body of the garage through the opening 10 will be housed and the complete automobile thus will be housed and protected from the weather.

The springs 15 will yield to permit the section 11 to swing outwardly from the plane of the fixed section 9 of the rear end wall of the garage freely enough to obviate damage to the front end portion of the automobile when the front end portion of an automobile is driven against the inner face of the section 11 either accidentally, as when a driver of an automobile is unable for any cause to stop the automobile within the garage short of the rear wall of the garage, or by intent, as when an automobile having a length greater than that of the body of the garage is driven into the garage. A driver of an automobile which is driven into the garage thus has assurance that injury will not result to the automobile should the automobile be driven either accidentally or by intent against the section 11 of the rear end wall of the garage.

It is obvious that the rear end wall of a garage of ordinary construction may be modified according to the invention and provided with the extension feature of the device at a relatively low cost. Also, many changes and adaptations of the form of the device that is illustrated in the accompanying drawings may be made without departing from the spirit and scope of the invention and I therefore consider as my own all such modifications and adaptations thereof as fairly fall within the scope of the claims.

I claim:—

1. In a garage having an opening at its front through which an automobile may enter the garage, a rear end wall having an opening through which a portion of said automobile may protrude from said garage, and an outwardly swingable section for closing said opening in said rear end wall of the garage.

2. In a garage having an opening at its front through which an automobile may enter the garage, a rear end wall having an opening through which a portion of said automobile may protrude from said garage, an outwardly swingable section for closing said opening in said rear end wall of the garage, and spring means yieldingly retaining said closure in position to close said opening in the rear end wall of said garage.

3. In a garage having an opening at its front through which an automobile may enter the garage, a rear end wall having an opening through which a portion of said automobile may protrude from said garage, an outwardly swingable section for closing said opening in said rear end wall of the garage, and a pair of side guard members extending from the side edges of said closure through said opening in the rear end wall of the garage said side guard members decreasing in width from their lower ends to their upper ends.

4. In a garage having an opening at its front through which an automobile may enter the garage, a rear end wall having an opening through which a portion of said automobile may protrude from said garage, an outwardly swingable section for closing said opening in said rear end wall of the garage, and a pair of side guard members extending from the side edges of said closure through said opening in the rear end wall of the garage, said side guard members decreasing in width from their lower ends to their upper ends, the lower edges of said side guard members being convexly curved longitudinally thereof.

5. A housing structure having spaced front and rear walls, said front wall having an opening for the ingress of an automobile, said rear wall having a section adapted to be swung outwardly by pressure applied against the inner face thereof by said automobile.

6. A housing structure having spaced front and rear walls, said front wall having an opening for the ingress of an automobile, said rear wall having a section adapted to be swung outwardly by pressure applied against the inner face thereof by said automobile, and a pair of side guard members extending forwardly from the side edges of the swingable section substantially at right angles with said swingable section.

7. A housing structure having spaced front and rear walls, said front wall having an opening for the ingress of an automobile, said rear wall having a section adapted to be swung outwardly by pressure applied against the inner face thereof by said automobile, a pair of side guard members extending forwardly from the side edges of the swingable section substantially at right angles with said swingable section, said swingable section being hinged at its upper end to a stationary portion of said rear wall, and spring means tending to retain said swingable section substantially in the plane of the stationary portion of said rear wall.

8. In a housing structure, spaced front and rear walls, said front wall having an opening for the ingress and egress of an automobile, said rear wall including a section swingable outwardly and upwardly from the plane of the remainder of said rear wall and adapted when in outwardly and upwardly swung position to serve as an extension housing for a portion of an automobile.

9. In a housing structure, spaced front and rear walls, said front wall having an opening for the ingress and egress of an automobile, said rear wall including a section swingable outwardly and rearwardly from the plane of the remainder of said rear wall and adapted when in outwardly and upwardly swung position to serve as an extension housing for a portion of an automobile, said outwardly and upwardly swingable section having a pair of side guard members, extending forwardly from the side-edges of said swingable section and adapted to be disposed completely within said housing structure when said swingable section is disposed in the plane of the remainder of said rear wall of the housing structure.

10. In a garage, a vertical wall including a section adapted to yield in an outward direction under impact or pressure, said garage having an entrance substantially opposite to said yieldable section adapted to admit an automobile for actuating said yieldable section.

11. In a garage, a vertical end wall having an opening extending from its bottom for part of the height of said vertical end wall, a primary closure unit comprising a section hinged at its upper edge to said vertical end wall at the upper edge of said opening and a pair of substantially triangular side guards extending from the side edge portions of said closure section through said opening, said side guards having slightly inclined edges for abutting the upper edge of said opening in the vertical end wall of the garage when said closure section is disposed in the plane of said opening.

12. In a garage, a vertical end wall having an opening extending from its bottom for part of the height of said vertical end wall, a primary closure unit comprising a section hinged at its upper edge to said vertical end wall at the upper edge of said opening and a pair of substantially triangular side guards extending from the side edge portions of said closure section through said opening, and a secondary closure unit hinged to said primary closure unit and self-adjusting to close the space between the lower edges of the members of the primary closure unit as said primary closure unit is swung outwardy from fully closed position.

13. In a garage, a vertical end wall having an opening extending from its bottom for part of the height of said vertical end wall, a primary closure unit comprising a section hinged at its upper edge to said vertical end wall at the upper edge of said opening and a pair of substantially triangular side guards extending from the side edge portions of said closure section through said opening, and a secondary closure unit hinged to said primary closure unit and self-adjusting to close the space between the lower edges of the members of the primary closure unit as said primary closure unit is swung outwardly from fully closed position, said secondary closure unit being adapted to telescope into said primary closure unit when said primary closure unit is in fully closed position.

14. In a garage, a vertical end wall having an opening extending from its bottom for part of the height of said vertical end wall, a primary closure unit comprising a section hinged at its upper edge to said vertical end wall at the upper edge of said opening and a pair of substantially triangular side guards extending from the side edge portions of said closure section through said opening, and a secondary closure unit comprising a pair of substantially triangular secondary side guard members disposed vertically edgewise close to the faces of the primary side guard members, transversely aligned pivot elements connecting the inner end portions of the corresponding primary and secondary side guard members with each other, and a cross member connecting the outer ends of said secondary side guard members and swingable close to the inner face of said closure section of the primary closure unit, the members of said secondary closure unit being adapted to swing by gravity until the edges of the corresponding primary closure unit, as said hinged section of the primary closure unit, is swung outwardly and upwardly from position in the plane of the remainder of said vertical end wall.

15. In a garage, a vertical end wall having an opening extending from its bottom for part of the height of said vertical end wall, a primary closure unit comprising a section hinged at its upper edge to said vertical end wall at the upper edge of said opening and a pair of substantially triangular side guards extending from the side edge portions of said closure section through said opening, and a secondary closure unit comprising a pair of substantially triangular secondary side guard members disposed vertically edgewise close to the faces of the primary side guard members, transversely aligned pivot elements connecting the inner end portions of the corresponding primary and secondary side guard members with each other, and a cross member connecting the outer ends of said secondary side guard members and swingable close to the inner face of said closure section of the primary closure unit, the members of said secondary closure unit being adapted to swing by gravity until the edges of the corresponding primary closure unit as said hinged section of the primary closure unit is swung outwardly and upwardly from position in the plane of the remainder of said vertical end wall, and wheels carried by the outer end portions of said secondary side guard members in positions to depend below the lower edges of said secondary side guard members in rolling contact with the surface which unerlies said garage.

16. In a garage, a vertical end wall having an opening extending from its bottom for part of the height of said vertical end wall, a primary closure unit comprising a section hinged at its upper edge to said vertical end wall at the upper edge of said opening and a pair of substantially triangular side guards extending from the side edge portions of said closure section through said opening, a secondary closure unit comprising a pair of substantially triangular secondary side guard members disposed vertically edgewise close to the faces of the primary side guard members, transversely aligned pivot elements connecting the inner end portions of the corresponding primary and secondary side guard members with each other, and a cross member connecting the outer ends of said secondary side guard members and swingable close to the inner face of said closure section of the primary closure unit, the members of said secondary closure unit being adapted to swing by gravity until the edges of the corresponding primary closure unit as said hinged section of the primary closure unit is swung outwardly and upwardly from position in the plane of the remainder of said vertical end wall, and wheels carried by the outer end portions of said secondary side guard members in positions to depend below the lower edges of said secondary side guard members in rolling contact with the surface which underlies said garage, the upper and lower approximately half portions of said cross member of the secondary closure unit being joined to each other at an obtuse angle.

17. In a garage, a vertical wall including a section adapted to yield in an outward and upward direction under impact or pressure, and means automatically adjustable on opening of said yieldable section to substantially close the space between the yieldable section and the underlying surface.

WILLIAM F. WATSON.